UNITED STATES PATENT OFFICE.

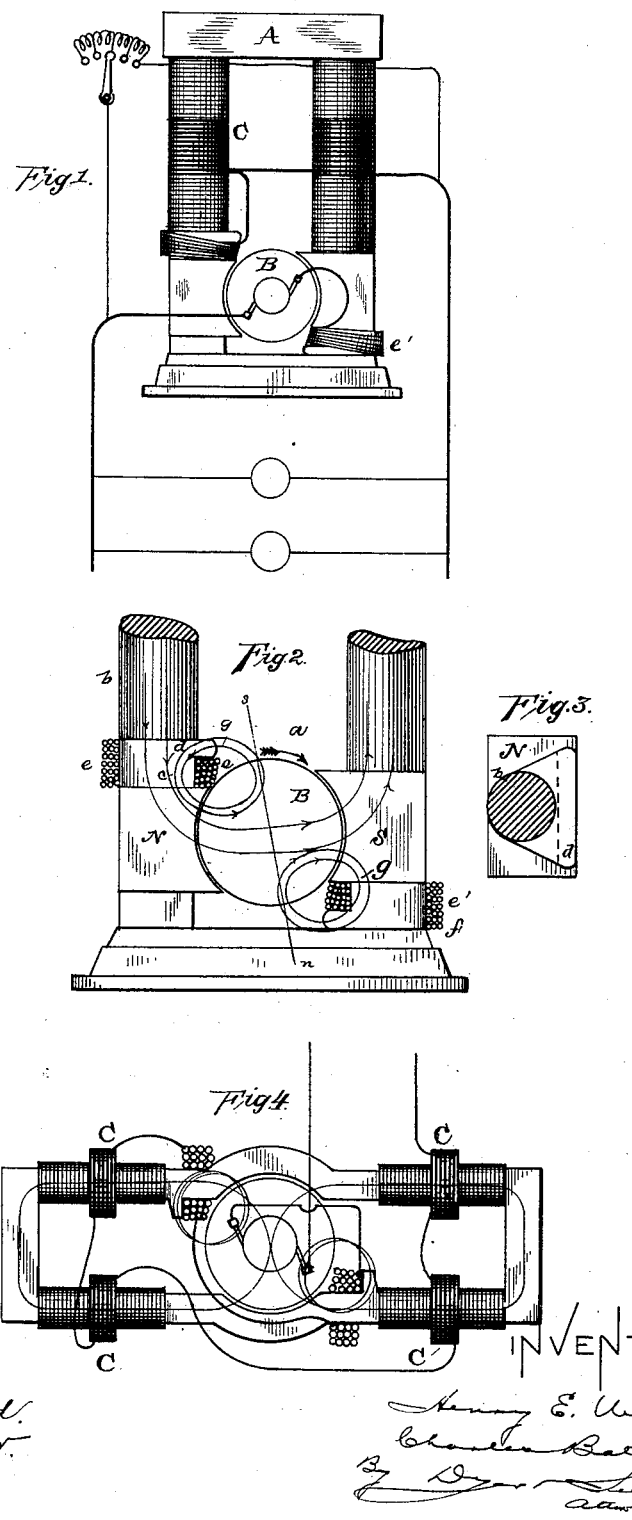

HENRY E. WALTER, OF CLIFTON, AND CHARLES BATCHELOR, OF NEW YORK, N. Y.

DYNAMO-ELECTRIC MACHINE.

SPECIFICATION forming part of Letters Patent No. 360,259, dated March 29, 1887.

Application filed November 6, 1886. Serial No. 218,120. (No model.)

*To all whom it may concern:*

Be it known that we, HENRY E. WALTER, of Clifton, in the county of Richmond and State of New York, and CHARLES BATCHELOR, of New York, in the county and State of New York, have jointly invented a certain new and useful Improvement in Dynamo-Electric Machines, of which the following is a specification.

The object of our invention is to provide dynamo-electric machines or electro-dynamic motors in which the non-sparking points of the commutator will remain constant, so that the position of the commutator-brushes will not have to be changed under variations of load and armature-current.

It has heretofore been proposed or attempted to maintain the non-sparking points constant by means of coils wound around the armature, so as to neutralize the magnetism of the armature produced by the current in the generating-coils. We have found, however, that there is another cause for the changes in non-sparking points besides the armature-magnetization—namely, the self-induction in the coils occurring when a coil leaves the commutator-brushes, and which varies with every change of load and current.

Our invention consists, mainly, in a certain construction and arrangement of devices for neutralizing this self-induction by generating in each coil at the instant when it leaves the commutator-brushes an electro-motive force opposed to the self-induction. Such means consist of coils in series with the armature-coils wound around the pole-pieces or legs of the field-magnet at diagonally-opposite parts of the magnetic field, and in such position that local magnetic circuits produced by said coils intersect the armature-coils at the points with which the commutator-brushes are connected, which is the normal neutral line, or neutral line with no load, coming in the same direction as do the lines of force from the pole which the armature-coil is approaching. The lines of force of this magnetic circuit are of such strength, as first, to neutralize the lines of force coming from the armature-poles, and at the same time generate in the armature-coils a sufficient electro-motive force to neutralize the self-induction. The coils being in series with the armature-coils their effect varies as the armature-current varies, and therefore the neutralization is always maintained. The coils being wound, as stated, around the pole-pieces, in addition to producing the local magnetic circuit, act also in a generator to increase the strength of the field-magnet. This effect may be employed to produce a compound machine—a constant potential generator. In a motor the neutralizing-coils tend to decrease the field strength, whereby a constant-speed motor may be produced. For small machines this arrangement is an effective one; but for large ones the change of field strength will be too great, and we therefore prefer to counteract it by winding upon the field-magnet cores an extra differential coil of coarse wire, also in series with the armature. By properly proportioning the coils the machine may be made a constant one.

Our invention is illustrated in the annexed drawings, in which—

Figure 1 is a view in elevation of a dynamo-electric machine or electro-dynamic motor embodying said invention; Fig. 2, a diagram of the armature and pole-pieces with the neutralizing-coils in section; Fig. 3, a section on line *x x* of Fig. 1; and Fig. 4 represents our invention as employed with the Siemens form of field-magnet.

Referring first to Figs. 1, 2, and 3, A represents the field-magnet, and B the armature, of a dynamo-machine. The arrow *a* shows the direction of revolution of the armature. Between the lower end of one field-magnet core, *b*, and its pole-piece N is placed a plate, *c*, having an outwardly-extending lip, *d*. The plate and lip are preferably of the shape shown, the greatest breadth of the plate being on the side toward the armature, and it being contracted to the size of the core on the opposite side. Between the lip *d* and the pole-piece is wound a coil, *e*, which on the side away from the armature is spread out, instead of being wound closely, as on the inner side. A similar plate, *c′*, with a lip, *d′*, is placed beneath the pole-piece S, between it and the zinc plate *f*, and around *c′* is wound a coil, *e′*. Coils *e* and *e′* are both connected in series with the armature. These coils tend to produce local magnetic circuits on the side toward the armature, the lines of force of which circuits are represented by $g\ g$, which lines of force intersect the armature-coils at the normal neutral line, or neutral line of no load, with which points the commutator-brushes are connected. These lines of force come from the same direction as those coming from the pole-pieces which the coils are approaching, and they therefore generate current in the coils in the same direction as that which they will have to carry after leaving the commutator-brushes, whereby the self-induction is neutralized, and the total field strength is increased in addition to the direct effect on the pole of the coils wound around them.

C is the extra differential coil, wound upon the field-magnet in series with the armature-coils, and designed, as above stated, in large machines to counteract the excessive increase in field strength, due to the neutraling-coils in series with the armature.

It is evident, of course, that the neutralizing-coils will also have local magnetic circuits at their portions away from the armature; but in order to avoid a great waste of energy in this way the coils are wound, as shown, with the greatest part of their length next to the armature, and are also spread out on the side away from the armature, while they are concentrated at their effective part, so that the greatest part of the energy is expended in producing the local circuits at $g\ g$. The lips assist in forming the local circuit of the neutralizing-coils, and it will be seen that almost all of this circuit is through iron, only a very little of it being through the air.

In the Siemens magnet-machine (shown in Fig. 4) lips $h\ h$ are formed upon or near the poles of the magnet at diagonally-opposite parts of the field, and within these lips the neutralizing-coils $e$ are wound, so that a local magnetic circuit from each of them intersects the armature-coils, the effect being as already fully explained.

The differential coils C are arranged and connected as already described.

It is evident that our invention is also applicable to electro-dynamic motors. The reversal of the machine also reverses the effect of the neutralizing-coils and of the differential coils, so that the result is the same.

What we claim is—

1. In a dynamo-electric machine, the combination, with the armature and field magnet, of coils wound around the magnet, connected in series with the armature, and in such position that a magnetic circuit therefrom sufficient to neutralize the self-induction intersects the armature-coils at the normal neutral line, substantially as set forth.

2. In a dynamo-electric machine, the combination, with the armature and field-magnet, of two coils wound around the magnet at diagonally-opposite parts of the field, both connected in series with the armature, and in such positions that a magnetic circuit from each coil sufficient to neutralize the self-induction intersects the armature-coils at the normal neutral line, substantially as set forth.

3. In a dynamo-electric machine, the combination, with the armature, of the field-magnet having projecting lips, and the neutralizing-coils wound around the magnet between said lips and the armature, substantially as set forth.

4. In a dynamo-electric machine, the neutralizing-coils wound around the field-magnet and having the greater portion of their length on the side toward the armature, substantially as set forth.

5. In a dynamo-electric machine, the neutralizing-coils wound around the field-magnet, such coils being concentrated on the side toward the armature and spread out on the other side, substantially as set forth.

6. In a dynamo-electric machine, the combination, with a field-magnet core and pole-piece, of a plate between the same, having a projecting lip, and the neutralizing-coil wound upon said plate between said lip and the pole-piece, substantially as set forth.

7. In a dynamo-electric machine, the combination, with a field-magnet core and pole-piece, of the plate between the same, having a wide portion on the side next the armature and being contracted at the opposite side, and the neutralizing-coil wound thereon, substantially as set forth.

8. In a dynamo-electric machine, the combination, with the neutralizing-coil in series, with the armature wound around the field-magnet in such position that a magnetic circuit from said coil sufficient to neutralize the self-induction intersects the armature-coils at the normal neutral line, of the extra differential field-magnet coil, also in series with the armature, substantially as set forth.

This specification signed and witnessed this 1st day of November, 1886.

HENRY E. WALTER.
CHAS. BATCHELOR.

Witnesses:
WM. PELZER,
E. C. ROWLAND.